United States Patent Office.

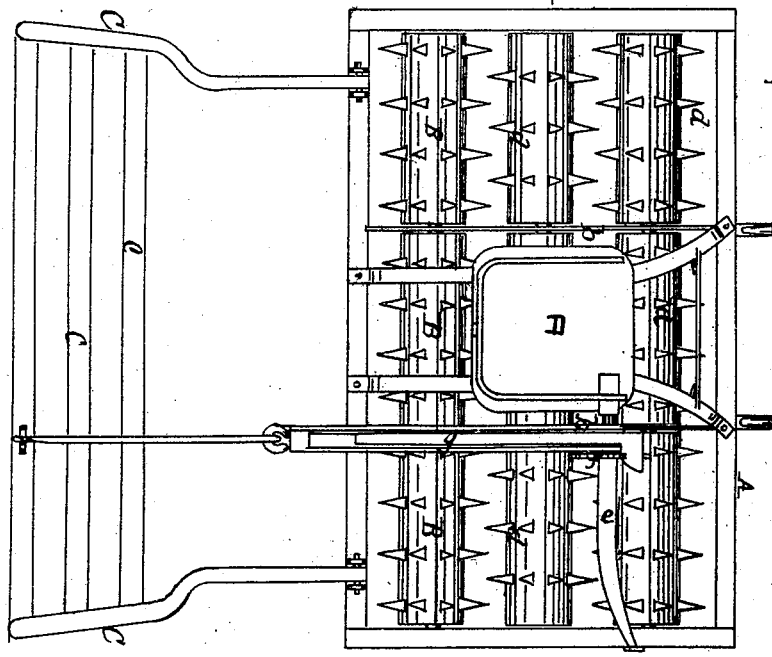
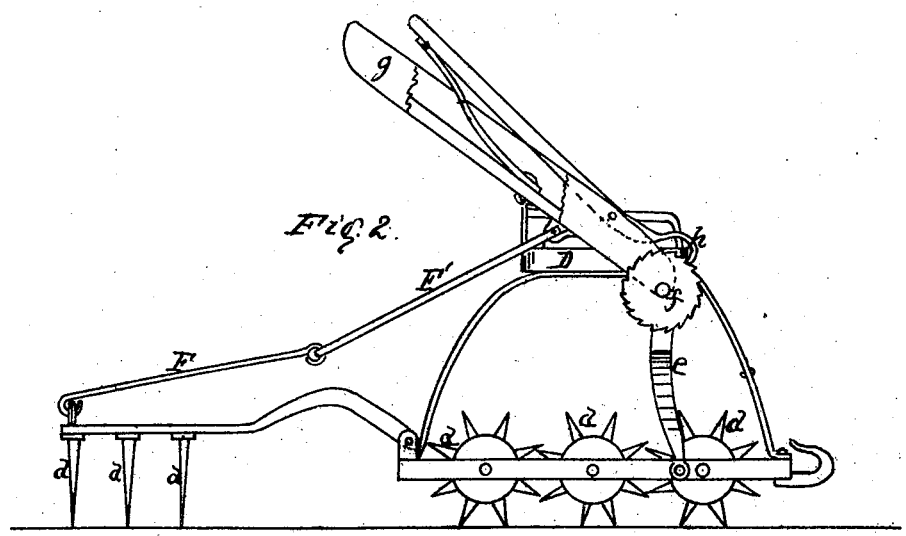

J. RUHL, OF DEFIANCE, OHIO.

Letters Patent No. 75,202, dated March 8, 1868.

---

IMPROVEMENT IN HARROWS.

---

The Schedule referred to in these Letters Patent and making part of the same.

---

TO ALL WHOM IT MAY CONCERN:

Be it known that I, J. RUHL, of Defiance, in the county of Defiance, and State of Ohio, have invented certain new and useful Improvements in Harrows; and I do hereby declare that the following is a full, clear, and exact description thereof, reference being had to the accompanying drawings, and to the letters of reference marked thereon, which form a part of this specification, in which—

Figure 1 is a plan, and

Figure 2 a side elevation of my harrow.

The nature of this invention consists in the employment of a series of independent rollers, provided with teeth, in combination with a hinged frame, also furnished with teeth, and arranged to be elevated and retained in position by means of a lever, to which is attached a pawl, said pawl acting upon a stationary ratchet-wheel, substantially as hereinafter set forth.

To enable others to avail themselves of the benefits of my invention, I will proceed to describe its construction and operation.

A represents the main frame, with the partitions $b\ b$. Between these partitions and the side of the frame are pivoted the rollers B B B, said rollers being provided with teeth $d\ d\ d$. To the rear end or side of frame A is hinged a second frame, C, which is furnished with cross-piece $c\ c$; said frame and cross-pieces are likewise furnished with teeth $d\ d\ d$. F F' represent two bars, linked or hinged together at their inner ends, and the outer end of F being secured to the frame C, and the opposite end of F' formed with a slot by means of which it may be pivoted to the lever. D indicates the driver's seat, mounted or placed upon two curved bars or springs, said springs being fastened to the frame A at their ends. $e$ represents a curved metal bar, one end being secured to the frame A, and the other end secured to the seat D. To the side of said bar is fastened one end of the axle of the ratchet-wheel $f$. Said ratchet-wheel $f$ is firmly attached to its opposite end. Between the side of the bar $e$ and ratchet-wheel $f$, pivoted to the axle of the ratchet, is the lever $g$. This lever is formed into two plates, and closed at its rear side, the front side of which is left open. $h$ is a pawl, pivoted to the inner sides of the lever, as shown in fig. 2, and extending upward, inside of said lever, a suitable distance, so that it can be conveniently operated. To the under side of pawl $h$ is provided a spring, which causes the pawl to engage with the ratchet-wheel $f$.

Thus it will be observed that simply by pushing lever $g$ forward, the rear frame C will be thrown up, and by placing the pawl $h$ in the ratchet-wheel $f$, it will be retained in an elevated position.

My harrow is peculiarly adapted to the preparation of ploughed ground for planting grain, as the revolving rollers will break the large clods of dirt, while the rear frame or harrow will collect the cornstalks, stubble, &c., which, by the least or simple motion of the lever, are discharged in a pile, to be easily removed from the field or burnt.

Having thus fully described my invention, what I claim as new, and desire to secure by Letters Patent, is—

The revolving harrows B B, hinged frame C, lever $g$, pawl $h$, and stationary ratchet-wheel $f$, all arranged in combination, substantially as and for the purpose set forth and described.

In testimony that I claim the foregoing as my own, I affix my signature in presence of two witnesses.

J. RUHL.

Witnesses:
S. T. SUTPHEN,
JOHN W. BAIR.